United States Patent [19]

Okamura et al.

[11] Patent Number: 5,373,046
[45] Date of Patent: Dec. 13, 1994

[54] PROCESS FOR PRODUCING A RESIN COMPOUND

[75] Inventors: Michiya Okamura; Tetsuo Konno; Kouichi Sagisaka, all of Ibaraki; Masakazu Ikeda, Mie, all of Japan

[73] Assignee: Mitsubishi Petrochemical Co., Ltd., Tokyo, Japan

[21] Appl. No.: 87,891

[22] Filed: Jul. 9, 1993

[30] Foreign Application Priority Data

Jul. 10, 1992 [JP] Japan ................... 4-206190

[51] Int. Cl.$^5$ ............ C08K 7/14; C08K 7/06; C08K 7/08; C08J 5/10
[52] U.S. Cl. .................. 524/413; 524/451; 524/494; 524/496
[58] Field of Search ............ 524/413, 449, 451, 606, 524/425, 496, 447; 523/351; 528/339; 252/511

[56] References Cited

U.S. PATENT DOCUMENTS

| | | |
|---|---|---|
| 3,516,961 | 6/1970 | Robb . |
| 3,591,526 | 7/1971 | Kawashima et al. ............ 252/511 |
| 3,668,172 | 6/1972 | Jones et al. . |
| 4,476,274 | 10/1984 | Liu ............................. 525/146 |
| 4,510,078 | 4/1985 | Mehta ........................ 524/495 |
| 4,670,508 | 6/1987 | Ohdaira et al. ............... 524/495 |
| 4,699,944 | 10/1987 | Saito et al. ................... 524/413 |
| 4,857,232 | 8/1989 | Burns ........................ 252/511 |
| 4,929,388 | 5/1990 | Wessling ...................... 524/495 |
| 5,098,610 | 3/1992 | Okamura et al. ............. 524/495 |
| 5,212,222 | 5/1993 | Mitsuuchi et al. .............. 524/495 |

FOREIGN PATENT DOCUMENTS

| | | |
|---|---|---|
| 3034747 | 4/1982 | Germany . |
| 3510959 | 10/1986 | Germany . |
| 60-065064 | 4/1985 | Japan . |
| 62-100553 | 5/1987 | Japan . |

*Primary Examiner*—Veronica P. Hoke
*Attorney, Agent, or Firm*—Oblon, Spivak, McClelland, Maier, & Neustadt

[57] ABSTRACT

A process for producing a resin compound applicable to precise electronic parts, especially sliding member from thermoplastic engineering plastics is disclosed, comprising compounding (I) a carbon masterbatch comprising polyethylene having a density of not less than 0.92 g/cm$^3$ and an MI of from 0.1 to 30 g/10 min, conductive carbon black, and talc and (II) a thermoplastic engineering plastic. The carbon black is satisfactorily dispersed to impart satisfactory heat conductivity to a molded article to thereby providing a sliding member with little wear and long durability.

7 Claims, No Drawings

PROCESS FOR PRODUCING A RESIN COMPOUND

FIELD OF THE INVENTION

This invention relates to a process for producing a resin compound and more particularly to a process for producing a resin compound which is suitable for a sliding member with satisfactory performance characteristics required in application to precise electronic parts, such as information and image equipment, i.e., dimensional accuracy, tribology characteristics, mechanical characteristics, molding accuracy, and the like.

BACKGROUND OF THE INVENTION

In the field of precise electronic parts of information and image processing equipment, etc., techniques in weight reduction, thickness reduction and diversity of specifications have been drastically developing. Main parts in driving devices of copying machines, printers, and video-related equipment are required to have high precision, strong mechanical characteristics, and high tribology characteristics, such as friction and abrasion characteristics. These parts have generally been made of aluminum alloys. However, aluminum alloys are disadvantageous in that they are heavy and need various fabrication steps, achieving poor productivity, which incurs high production cost.

Hence, various attempts have been made in order to use thermoplastic resins which are cheaper and achieve excellent productivity as materials of these parts in place of metal alloys. However, conventionally proposed composite materials of thermoplastic resins cannot satisfy the above-mentioned requirements, i.e., high precision, strong mechanical characteristics and high tribology characteristics, particularly in terms of wear and friction coefficient with a substrate or an object of sliding and changes of these characteristics with time, and are not always sufficient for substituting for the conventional metallic parts.

SUMMARY OF THE INVENTION

An object of the present invention is to provide a process for producing a resin compound with satisfactory performance characteristics, such as high precision, strong mechanical characteristics, and high tribology characteristics.

The above object of the present invention is accomplished by previously preparing a carbon black-containing molten mixture (hereinafter referred to as a carbon masterbatch), compounding the resulting carbon masterbatch and a thermoplastic engineering plastic, and melt molding the resulting resin compound.

The present invention provides a process for producing a resin compound comprising melt-kneading (a) from 40 to 90% by weight of polyethylene having a density of not less than 0.92 g/cm$^3$ and a melt index (MI) of from 0.1 to 30 g/10 min, (b) from 10 to 40% by weight of conductive carbon black, and (c) not more than 20% by weight of talc, based on the total amount of (a), (b) and (c), to prepare (I) a mixture having an MI of from 0.1 to 40 g/10 min, compounding (I) from 3 to 150 parts by weight of the resulting mixture and (II) 100 parts by weight of a thermoplastic engineering plastic.

DETAILED DESCRIPTION OF THE INVENTION

Melt index (MI) is measured in accordance with JIS-K7210 (temperature: 230° C.; load: 8.55 kg) in the present invention.

Polyethylene as component (a) which can be used in the present invention has a density of not less than 0.92 g/cm$^3$, preferably from 0.945 to 0.98 g/cm$^3$ and an MI of from 0.1 to 30 g/10 min, preferably from 5 to 20 g/10 min.

Polyethylene having a density of less than 0.92 g/cm$^3$ has poor affinity to carbon black to cause carbon black to agglomerate, resulting in a reduction in impact strength of the resulting molded article. The upper limit of the polyethylene density is about 0.98 g/cm$^3$. If the MI of polyethylene is out of the above range, dispersion of carbon black becomes non-uniform, resulting in a reduction in mechanical strength of the resulting molded article.

Polyethylene to be used in the present invention includes not only ethylene homopolymers but copolymers comprising ethylene and not more than 15% by weight of other olefins or copolymerizable vinyl monomers.

Carbon black as component (b) is obtained by incomplete combustion or pyrolysis of hydrocarbons and classified into furnace black obtained by incomplete combustion of hydrocarbons in a furnace; channel black obtained by applying natural gas flames to channel steel; thermal black obtained by pyrolysis of natural gas; and acetylene black obtained by pyrolysis of acetylene; etc.

In the present invention, acetylene black and oil furnace black obtained from liquid hydrocarbons, particularly oil furnace black, are preferred from the standpoint of small impurities and excellent conductivity.

Oil furnace black includes XCF (extra conductive furnace black), SCF (superconductive furnace black), CF (conductive furnace black), and SAF (super abrasion furnace black). Any of these oil furnace black species can be used for preference, and, among them those having a BET specific surface area of 850 m$^2$/g or more, especially 900 m$^2$/g or more, as measured by N$_2$ adsorption are more preferred.

Specific examples of XCF are "Ketjen Black EC" produced by Ketjen Black International Co. and "Vulcan SC-72" produced by Cabot G. L. Inc.; those of SCF are "Vulcan SC" or "Vulcan P" produced by Cabot G. L. Inc. and "Corax L" produced by Degussa Co.; those of CF are "Vulcan C" produced by Cabot G. L. Inc. and "Conductex SC" produced by Colombian Carbon Co.; and those of SAF are "Asahi #9" produced by Asahi Carbon Co., Ltd., "Diablack A" produced by Mitsubishi Kasei Kogyo Corp., and "Vulcan 9" produced by Cabot G. L. Inc. These species may be used in combination.

In general, where polyethylene is blended with polyacetal, polycarbonate, etc., the compound is liable to delamination due to insufficient compatibility. In this connection, highly conductive oil furnace black has on the surface thereof a graphite structure, which exhibits specific affinity to the crystal structure of polyethylene. Therefore, the oil furnace black and polyethylene are well compatible to each other to provide a composition which does not undergo delamination while exhibiting high conductivity.

Talc as component (c) which can be used if desired in the present invention suitably has an average particle size of from 0.2 to 50 μm, and preferably from 0.2 to 20 μm. Talc with such a particle size particularly contributes to improvement on impact strength and dispersibility of carbon black.

The "average particle size" as used herein is measured by a photo-extinction method according to a liquid phase sedimentation system. Measuring apparatus include "Model SA-CP" manufactured by Shimadzu Corporation and "Model SKN" manufactured by Seishin Kigyo Co., Ltd. A particle size distribution can also be measured with the same apparatus.

The "specific surface area" as used herein is measured by a usual, so-called air transmission method with a constant pressure aeration type specific surface area measuring apparatus, e g., "Model SS-100" manufactured by Shimadzu Corporation.

Thermoplastic engineering plastics as component which can be used in the present invention are not particularly limited and widely selected from those commonly used in injection molding. Examples of suitable thermoplastic engineering plastics include polyamide, saturated polyester, polyacetal, polycarbonate, polyether sulfone, polyphenylene oxide, polyphenylene sulfide, polyether ether ketone, AS resin (acrylonitrile-styrene resin), ABS resin, polyarylate, LCP (liquid crystallin polymer), and polyether-imide. Preferred of them are polyamide, saturated polyester, polyacetal, polycarbonate, and polyphenylene sulfide.

If desired, mechanical strength and dimensional accuracy of the sliding member can further be improved by compounding into 100 parts by weight of the thermoplastic engineering plastic from 5 to 150 parts by weight of-at least one fibrous reinforcement selected from (1) carbon fiber having an average diameter of from 3 to 20 μm and an average length of from 0.03 to 60 mm, (2) glass fiber having an average diameter of from 3 to 15 μm and an average length of from 0.05 to 10 mm, and (3) potassium titanate fiber having an average diameter of from 0.1 to 3 μm and an average length of from 5 to 120 μm.

As carbon fiber, general chopped carbon fiber is used. PAN type carbon fiber prepared from polyacrylonitrile is preferred in view of its excellent mechanical and dimensional characteristics. Carbon fiber to be used has an average diameter of from 3 to 20 μm, preferably from 3 to 10 μm, and an average length of from 0.03 to 60 mm, preferably from 0.5 to 30 mm. If the average diameter or average length is out of the above range, the mechanical strength and dimensional accuracy of the resulting molded article are reduced. The carbon content in the carbon fiber is preferably 95% or higher.

The carbon fiber added is dispersed in the molded article, e.g., an injection molded article, with its average length somewhat decreased, usually being from 0.03 to 5 mm, and makes a contribution to good balance of mechanical characteristics and dimensional characteristics.

The carbon fiber may contain a surface treating component usually in an amount of from 2 to 8% by weight for the purpose of improving adhesion and affinity to the thermoplastic engineering plastics.

Glass fiber which can be used in the present invention has an average diameter of from 3 to 15 μm, preferably from 5 to 12 μm, and an average length of from 0.05 to 10 mm, preferably from 0.1 to 6 mm. If the average diameter is out of the above range, sufficient mechanical strength cannot be obtained. If the average length is out of the above range, sufficient dimensional accuracy cannot be obtained.

The above-mentioned glass fiber added is dispersed in the molded article, e.g., an injection molded article, with its average length somewhat decreased, usually being in a range of from 0.05 to 10 mm, making a contribution to improvements in dimensional accuracy, mechanical strength and high tribology characteristics.

The glass fiber may contain a surface treating component usually in an amount of from 0.01 to 0.6% by weight for the purpose of improving adhesion and affinity to the thermoplastic engineering plastics.

While the glass fiber to be used may be chosen from commercially available products, it may be prepared by a process comprising melting glass marbles in a bushing, drawing the molten glass strings falling through the orifices of the bushing at a high speed while being bundled with greige goods in a shoe, followed by drying and winding around a rotating drum. The average diameter of the glass fiber is decided by selecting the diameter of the orifices and the drawing conditions.

The form of the glass fiber may be any of roving, chopped strands, strands, and the like. Grindings of strands, called milled fiber or glass powder, are also employable. From the standpoint of processability in mixing with resins, chopped strands are preferred. The starting glass composition is preferably no-alkali glass, for example E glass.

Potassium titanate fiber which can be used in the present invention is fine, white, needle-like single crystal fiber having an average diameter of from 0.1 to 3.0 μm, preferably from 0.4 to 1.5 μm, and an average length of from 5 to 120 μm, preferably from 20 to 100 μm. If the fiber size is out of the above ranges, sufficient mechanical strength and dimensional accuracy cannot be obtained. The potassium titanate fiber may be subjected to a known surface treatment, such as a treatment with an aminosilane, epoxysilane or titanate surface treating agent, preferably an aminosilane agent, to improve adhesion.

The resin compound which can be used in the present invention comprises (II) 100 parts by weight of a thermoplastic engineering plastic and (I) from 3 to 150 parts by weight, preferably from 3 to 100 parts by weight, especially from 3 to 50 parts by weight, of a carbon masterbatch comprising (a) from 40 to 90% by weight, preferably from 50 to 80% by weight, of polyethylene, (b) from 10 to 40% by weight, preferably from 15 to 35% by weight, of carbon black, and, if necessary, (c) not more than 20% by weight, preferably from 5 to 20% by weight, more preferably from 5 to 15% by weight, of talc, based on the total amount of components (a), (b) and (c).

If desired, the resin compound may further comprise (d) not more than 150 parts by weight, preferably from 5 to 150 parts by weight, and more preferably from 20 to 150 parts by weight, of at least one fibrous reinforcement selected from carbon fiber, glass fiber and potassium titanate fiber.

Should the amount of either of components (a) and (b) be out of the respective range, or should the amount of component (c) or (d) exceed the respective upper limit, the resulting resin compound fails to provide a molded article having excellent performance properties required as a sliding member of precise electronic parts. More specifically, if the amount of component (a) is too little, the molded article has an increased coefficient of friction. If it is too much, component (a) develops appreciable phase separation from the thermoplastic engineering plastic, and the molded article suffers from delamination and reduction in mechanical strength. If the amount of component (b) is too little, electrical conductivity of the resulting molded article is reduced, and the heat energy generated on sliding friction with an object of sliding would be accumulated to accelerate wear of the substrate or the object with heat generation. If it is too much, the mechanical strength of the molded article is reduced. If the amount of component (c) is too much, the molded article becomes brittle. Taking dispersibility of carbon black and mechanical strength of the resulting molded article into consideration, component (c) is desirably added in an amount of at least 5% by weight.

If the amount of component (d) as fibrous reinforcement is less than 5% by weight, no improvement in dimensional accuracy and mechanical strength is expected. If it is too much, moldability of the resin compound is impaired, and the reinforcement cannot be sufficiently be dispersed, which leads to reductions in impact strength and appearance of the molded article.

If desired, the resin compound to be molded may further contain additional components besides the essential components as long as the effects of the present invention are not seriously impaired. Such additional components include various fillers, e.g., calcium carbonate (precipitated, ground or colloidal), mica, silica, alumina, aluminum hydroxide, magnesium hydroxide, barium sulfide, zinc oxide, zeolite, wollastonite, diatomaceous earth, glass beads, bentonite, montmorillonite, asbestos, hollow glass balloons, graphite, molybdenum disulfide, titanium oxide, aluminum fiber, stainless steel fiber, brass fiber, aluminum powder, woodmeal, rice hull, etc.; thermoplastic resins other than the above-described essential resin components, e.g., polypropylene, polyethylene (low-density or linear low-density), a propylene-ethylene block or random copolymer, and a maleic anhydride-modified polyolefin; rubbers or latex components, e.g., an ethylene-propylene copolymer rubber, a styrene-butadiene rubber, a styrene-butadiene-styrene block copolymer or a hydrogenation derivative thereof, polybutadiene, and polyisobutylene; thermosetting resins, e.g., epoxy resins, melamine resins, phenol resins, and unsaturated polyester resins; antioxidants (phenol type, sulfur type), lubricants, organic or inorganic pigments, ultraviolet absorbents, antistatic agents, dispersants, neutralizing agents, blowing agents, plasticizers, copper poison inhibitors, flame retarders, cross-linking agents, and flow modifiers.

These additional components perform their several function in improving balance of physical properties, surface properties of molded articles such as scratch resistance, gloss and appearance (e.g., weld-marks, silver streaking, flow marks), printability, coating properties, adhesion properties, plating properties, molding properties, fabricability, and durability.

The resin compound of the present invention can be prepared first by kneading components (a), (b), and if desired, (c) by means of an ordinary kneading machine, e.g., a single-screw extruder, a twin-screw extruder, a Banbury mixer, a roll, a Brabender Plastograph, or a kneader to prepare carbon masterbatch (I) and compounding carbon masterbatch (I) with thermoplastic engineering plastic (II), if desired, together with various fibrous reinforcements at a prescribed ratio by means of the above-mentioned kneading machine to prepare pellets.

In general, when carbon black is compounded into a polymer, molecular cleavage initiates in the polymer due to the impurities present in carbon black and further develops by shearing during kneading. As a result, the polymer reduces its molecular weight to have a reduced impact strength. This tendency is conspicuously observed with polyacetal. Accordingly, it is effective to previously disperse carbon black (b) in polyethylene (a) before being compounded into engineering plastics (II).

Further, the dispersion of carbon black greatly influences tribology characteristics. Uniform dispersion can be achieved by previously dispersing carbon black in polyethylene, thereby obtaining improved tribology characteristics. If carbon black is added to the engineering plastic directly but not in the form of a previously prepared masterbatch, in other words, if all the components are simultaneously mixed together, dispersion of carbon black would be non-uniform, resulting in not only a reduction in strength but an increase in wear and frictional coefficient.

The above-mentioned resin compound exhibits excellent dimensional accuracy on molding and provides a molded article with high rigidity. The molded articles thus obtained are excellent as sliding members of electrical equipments and business machines, etc., such as rotating parts, gears, rotary bearings, and guide rolls for magnetic tape.

The present invention will now be illustrated in greater detail with reference to Examples, but it should be understood that the present invention is not construed as being limited thereto. All the percents and parts are by weight unless otherwise indicated.

EXAMPLES

Physical properties of specimens prepared and MI of carbon masterbatches prepared were measured according to the following test methods. As practical performance demanded for sliding members of precise electronic parts, an abrasion loss is not more than 8 mg, an Izod impact strength of not less than 5 kg·cm/cm, and a coefficient of linear expansion of not more than $4.0 \times 10^{-5}/°C.$, each as measured by the following test method.

1) Abrasion Loss and Coefficient of Friction

Testing equipment:
Ito type instrumental abrasion tester "Model IAT-40/1500-01" manufactured by Tokyo Testing Machine Mfg. Co., Ltd.

Specimen:
injection molded specimen; 2mm thick, 30 mm long and 30 mm wide

Object:
SUS 45C ring having a diameter of 20 mm, a width of 2.8 mm, and a test effective diameter (d) of 22.8 mm.

Procedure:
The SUS 45C ring was revolved in one direction on a fixed specimen.

Measuring Condition:
load: 8 kg/cm$^2$ or 14 kg/cm$^2$
revolution: 180 rpm
test time: 5 hrs An abrasion loss (mg) was obtained by subtracting the weight of the specimen after the test from that before the test.

A coefficient of friction ($\mu$) was calculated from equation:

$$\mu = (1/\text{load}) \times T \times (d/2)$$

wherein T is a torque (kg·mm) obtained from the measurement chart; and d is a test effective diameter.

2) Flexural Modulus

Measured in accordance with ASTM D790.

3) Izod Impact Strength

Measured in accordance with ASTM D256.

4) MI of Carbon Masterbatch

Measured in accordance with JIS-K7210 (temperature: 230° C.; load: 8.55 kg)

5) Coefficient of Linear Expansion

Coefficient of linear expansion was measured as an indication of dimensional accuracy. Measurement was made in accordance with ASTM D696 at a rate of temperature rise of 2° C./min from 23° C. up to 100° C. with a measuring machine manufactured by Shinku Riko Co., Ltd.

Materials used in the following examples are as follows.

Polycarbonate: Iupilon S2000, manufactured by Mitsubishi Gas Chemical Company, Inc.

Polyphenylene sulfide: TOHPREN T4, manufactured by Tohpren Co., Ltd.

Polyamide 66: UltramidA A3K, manufactured by BASF Engineering Plastic Co., Ltd.

Low density polyethylene: Yukalon LK30, manufactured by Mitsubishi Petrochemical Co., Ltd.

High density polyethylene: Yukalon PY20, manufactured by Mitsubishi Petrochemical Co., Ltd.

Oil furnace black: Ketjen Black EC, manufactured by Ketjen Black International Company Acetylene black: Denka Black, manufactured by Denki Kagaku Kogyo Kabushiki Kaisha Talk: MT6B, manufactured by Fuji Talk Corp.

Carbon fiber: A6003, manufactured by Asahi Nihon Carbon Fiber Corp.

Glass Fiber: TMF200, manufactured by Asahi Fiber Corp.

Potassium titanate ($K_2O \cdot 6TiO_2$): HT302, manufactured by Titan Kogyo Corp.

Carbon Masterbatch A-1

In a twin-screw extruder were kneaded and pelletized 70 parts of low density polyethylene having a density of 0.92 g/cm$^3$ and an MI of 4 g/10 min (hereinafter after referred to as LDPE), 20 parts of oil furnace carbon black "Ketjen Black EC", and 10 parts of talc having an average particle size of 10 μm to obtain pellets having an MI of 0.4 g/10 min (hereinafter referred to as carbon masterbatch A-1).

Carbon Masterbatch A-2

Carbon masterbatch A-2 having an MI of 1.2 g/10 min was prepared in the same manner as for carbon masterbatch A-1, except for replacing the LDPE with high density polyethylene having a density of 0.97 g/cm$^3$ and an MI of 8 g/10 min (hereinafter referred to as HDPE).

Carbon Masterbatch A-3

Carbon masterbatch A-3 having an MI of 26 g/10 min was prepared in the same manner as for carbon masterbatch A-2, except replacing the oil furnace carbon black with acetylene black.

EXAMPLES 1 TO 16

A thermoplastic engineering plastic (polycarbonate, polyphenylene sulfide or polyamide) was mixed with carbon masterbatch A-1, A-2 or A-3 and, in some cases, PAN type carbon fiber (average diameter: 10 μm; average length: 3.0 mm), glass fiber (average diameter: 10 μm; average length: 3.0 mm) or potassium titanate fiber (average diameter: 0.8 μm; average length: 60 μm) at a mixing ratio shown in Tables 1 to 3 below, and the mixture was melt-kneaded in a twin-screw extruder to obtain pellets. The pellets were injection molded by using an in-line screw type injection molding machine to prepare specimens for measurement of physical properties. The results of the measurements are shown in Tables 1 to 3.

COMPARATIVE EXAMPLES 1 TO 14

Components shown in Tables 1 to 3 were melt-kneaded in a twin-screw extruder, pelletized, and injection molded in the same manner as in Examples. The results obtained are shown in Tables 1 to 3. The LDPE or HDPE shown in Tables were the same as those used in carbon masterbatches.

TABLE 1

| | Example No. | | | | | | | Comparative Example No. | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| Composition (part): | | | | | | | | | | | | | |
| Polycarbonate | 100 | 100 | 100 | 100 | 100 | 100 | 100 | 100 | 100 | 100 | 100 | 100 | 100 |
| LDPE | | | | | | | | 14 | | | | | |
| HDPE | | | | | | | | | | 14 | | | |
| Oil Furnace Black | | | | | | | | 4 | | 4 | | | |
| LDPE type carbon masterbatch A-1 | 20 | | | 120 | 5 | | | | 2 | | 20 | 20 | |
| HDPE type carbon masterbatch A-2 | | 20 | | | | 20 | 20 | | | | | | 170 |
| HDPE type carbon masterbatch A-3 | | | 20 | | | | | | | | | | |
| Talc | | | | | | | | | 2 | | 2 | | |
| Carbon fiber | | | | | 40 | | | | 40 | | 4 | | |
| Glass fiber | | | | | | 20 | | | | | 20 | | |
| Potassium titanate | | | | | | | 100 | | | | | 4 | |
| Physical Properties: | | | | | | | | | | | | | |
| Abrasion loss* (mg) | 0.5 | 0.4 | 0.4 | 1.4 | 6.5 | 4.8 | 5.6 | 48 | 85 | 78 | 1.1 | 0.9 | 2.1 |
| Coefficient of friction* | 0.20 | 0.16 | 0.12 | 0.10 | 0.24 | 0.38 | 0.22 | 0.26 | 0.41 | 0.52 | — | — | — |
| Flexural modulus (× 10$^4$ kg/cm$^2$) | 14 | 15 | 15 | 11 | 160 | 45 | 100 | 14 | 160 | 43 | 38 | 29 | 10 |
| Izod impact strength (kg · cm/cm) | NB | NB | NB | 8 | 16 | 11 | 8 | NB | 14 | 10 | 14 | 15 | 4 |
| Coefficient of linear expansion | — | — | — | — | 2.5 | 3.5 | 2.8 | — | 2.5 | 3.8 | 7.6 | 7.8 | — |

TABLE 1-continued

| | Example No. | | | | | | | Comparative Example No. | | | | | |
|---|---|---|---|---|---|---|---|---|---|---|---|---|---|
| | 1 | 2 | 3 | 4 | 5 | 6 | 7 | 1 | 2 | 3 | 4 | 5 | 6 |
| ($\times 10^{-5}/°C$.) | | | | | | | | | | | | | |

Note: *under a load of 8 kg/cm$^2$

TABLE 2

| | Example No. | | | | | | | Comparative Example No. | | | | |
|---|---|---|---|---|---|---|---|---|---|---|---|---|
| | 8 | 9 | 10 | 11 | 12 | 13 | 14 | 7 | 8 | 9 | 10 | 11 |
| Composition (part): | | | | | | | | | | | | |
| Polyphenylene sulfide | 100 | 100 | 100 | 100 | 100 | 100 | 100 | 100 | 100 | 100 | 100 | 100 |
| HDPE | | | | | | | | 18 | 18 | | | |
| Acetylene Black | | | | | | | | 5 | 5 | | | |
| LDPE type carbon masterbatch A-1 | 25 | | | 150 | 15 | | | | | 50 | | |
| HDPE type carbon masterbatch A-2 | | 25 | | | | | | | | | | |
| HDPE type carbon masterbatch A-3 | | | 25 | | | 20 | 10 | | | | 100 | 170 |
| Talc | | | | | | | | 2 | 2 | | | |
| Carbon fiber | | | | | 150 | | | | | | | |
| Glass fiber | | | | | | 40 | | | 20 | 4 | 4 | |
| Potassium titanate | | | | | | | 10 | | | | | |
| Physical Properties: | | | | | | | | | | | | |
| Abrasion loss* (mg) | 0.4 | 0.3 | 0.3 | 1.1 | 2.6 | 5.2 | 2.1 | 43 | 69 | 3.1 | 4.8 | 1.9 |
| Coefficient of friction* | 0.16 | 0.14 | 0.10 | 0.10 | 0.26 | 0.32 | 0.18 | 0.50 | 0.18 | 0.18 | 0.16 | — |
| Flexural modulus ($\times 10^4$ kg/cm$^2$) | 16 | 15 | 17 | 13 | 230 | 80 | 40 | 16 | 40 | 38 | 27 | 12 |
| Izod impact strength (kg · cm/cm) | 6 | 7 | 6 | 7 | 9 | 8 | 7 | 6 | 7 | 7 | 5 | 3 |
| Coefficient of linear expansion ($\times 10^{-5}/°C$.) | — | — | — | — | 1.8 | 2.3 | 2.7 | — | 4.2 | 4.8 | 6.3 | — |

Note: *under a load of 8 kg/cm$^2$

TABLE 3

| | Example 15 | Example 16 | Compar. Example 13 | Compar. Example 14 |
|---|---|---|---|---|
| Composition (part): | | | | |
| Polyamide 66 | 100 | 100 | 100 | 100 |
| HDPE type carbon masterbatch A-2 | 10 | 10 | 5 | |
| Carbon fiber | 20 | | | 20 |
| Glass fiber | | 20 | | |
| Physical Properties: | | | | |
| Abrasion loss *(mg) | 0.0 | 0.1 | 1.0 | 1.5 |
| Coefficient of friction* | 0.30 | 0.34 | 0.32 | 0.43 |
| Flexural modulus ($\times 10^3$ kg/cm$^2$) | 74 | 52 | 28 | 76 |
| Izod impact strength (kg · cm/cm) | 5.2 | 7.3 | 4.6 | 5.0 |
| Coefficient of linear expansion ($\times 10^{-5}/°C$.) | 5.2 | 5.8 | 8.5 | 5.6 |

Note: *under load of 14 kg

APPLICATION EXAMPLE 1

The resin compound in the form of pellets as prepared in Example 5 was molded by an in-line screw type injection molding machine to obtain a gear for a copying machine. After practical use of the gear for 400 days, neither wear nor damage of the gear teeth was observed.

APPLICATION EXAMPLE 2

The resin compound in the form of pellets as prepared in Example 14 was molded by an in-line screw type injection molding machine to obtain a gear for a printer. After practical use of the gear for 300 days, neither wear nor damage of the gear teeth was observed.

According to the process of the present invention, the most part or substantially the whole amount of carbon black is finely dispersed in polyethylene so that the polyethylene phase has heat conductivity. As a result, the heat energy generated by friction with an objective member on sliding is hardly accumulated, leading to a decrease in wear.

To the contrary, even with the composition being equal, where a resin compound is prepared by mixing all the components at the same time, the heat conductivity of the resulting molded article falls short because of the dispersed structure of carbon black, and the heat of friction is accumulated to cause great wear.

According to the present invention, a resin compound satisfying all of high tribology properties, high dimensional accuracy, and high mechanical strength can be obtained using engineering plastics which are generally considered to exhibit poor tribology performance. This makes it feasible to substitute a plastic sliding member for a metallic sliding member in highly precise electronic parts where conventional plastic sliding members cannot be applied, such as high precision gears of copying machines, printers, etc., high precision and high strength gears of video tape decks, and sliding parts with magnetic tape.

While the invention has been described in detail and with reference to specific examples thereof, it will be apparent to one skilled in the art that various changes and modifications can be made therein without departing from the spirit and scope thereof.

What is claimed is:

1. A process for producing a resin compound comprising:

melt-kneading (a) at least 40% by weight of polyethylene having a density of not less than 0.92 g/cm$^3$ and a melt index of from 0.1 to 30 g/10 min, (b) from 10 to 40% by weight of conductive carbon black, and (c) from 5% to 20% by weight of talc, the percent amount of each component based on the total amount of (a), (b) and (c), to prepare a mixture (I) having a melt index of from 0.1 to 40 g/10 min, compounding (I) from 3 to 150 parts by weight of the resulting mixture, (II) 100 parts by weight of a thermoplastic engineering plastic and (III) from 5 to 150 parts by weight, per 100 parts by weight of said engineering plastic, of at least one fibrous reinforcement selected from the group consisting of (1) carbon fiber having an average of diameter of from 3 to 20 μm and an average length of from 0.03 to 60 mm, (2) glass fiber having an average diameter of from 3 to 15 μm and an average length of from 0.05 to 10 mm, and (3) potassium titanate fiber having an average diameter of from 0.1 to 3 μm and an average length of from 5 to 120 μm.

2. A process as claimed in claim 1, wherein said fibrous reinforcement is compounded in an amount of from 5 to 150 parts by weight per 100 parts by weight of the thermoplastic engineering plastic.

3. A process as claimed in claim 1, wherein said mixture (I) comprises from 50 to 80% by weight of polyethylene, from 15 to 35% by weight of conductive carbon black, and from 5 to 15% by weight of talc, and said fibrous reinforcement is compounded in an amount of from 5 to 150 parts by weight per 100 parts by weight of the thermoplastic engineering plastic.

4. A process as claimed in claim 1, wherein said polyethylene has a density of from 0.945 to 0.98 g/cm$^3$ and a melt index of from 5 to 20 g/10 min.

5. A process as claimed in claim 1, wherein said conductive carbon black is acetylene black or oil furnace black.

6. A process as claimed in claim 1, wherein said conductive carbon black is oil furnace black having a BET specific surface area of not less than 850 m$^2$/g.

7. A process as claimed in claim 1, said engineering plastic is at least one of polyamide, saturated polyester, polyacetal, polycarbonate, polyester sulfone, polyphenylene oxide, polyphenylene sulfide, polyether ether ketone, acrylonitrile-styrene resin, acrylonitrile-butadiene-styrene resin, polyarylate, a liquid crystalline polymer, and polyether-imide.

* * * * *